June 19, 1956  C. E. TACK  2,751,046
COMBINATION BRAKE
Filed April 6, 1951  2 Sheets-Sheet 1

INVENTOR.
Carl F. Tack
BY
O. B. Garner
Atty.

June 19, 1956 C. E. TACK 2,751,046
COMBINATION BRAKE
Filed April 6, 1951 2 Sheets-Sheet 2
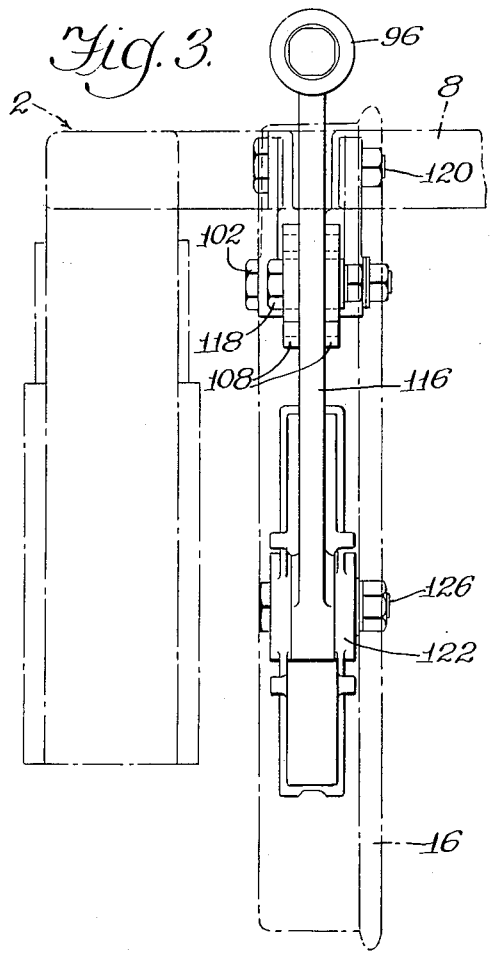
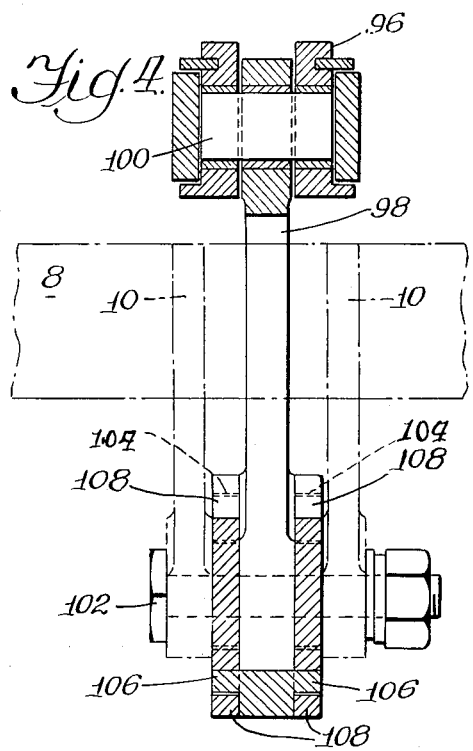
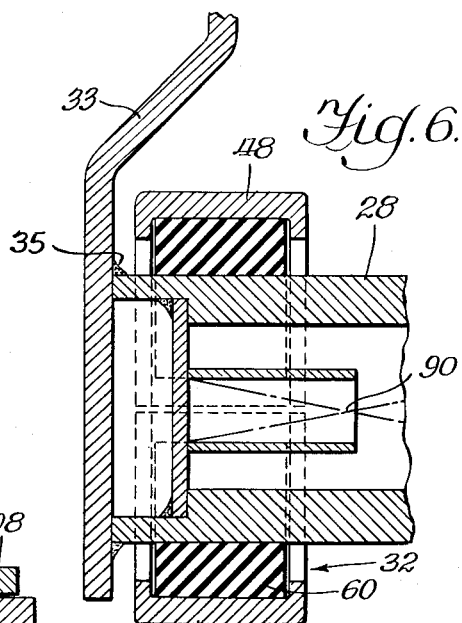
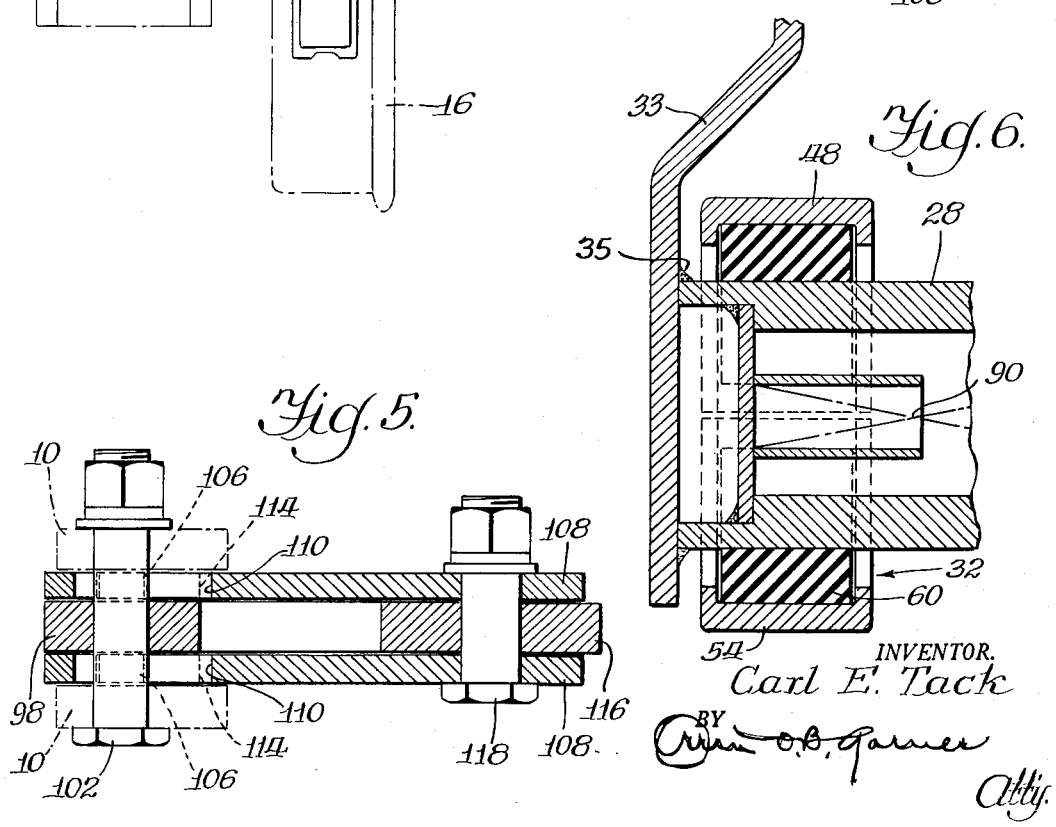
INVENTOR.
Carl E. Tack
BY
Atty.

United States Patent Office 2,751,046
Patented June 19, 1956

2,751,046

COMBINATION BRAKE

Carl E. Tack, Chicago, Ill., assignor to American Steel Foundries, Chicago, Ill., a corporation of New Jersey Application April 6, 1951, Serial No. 219,638

11 Claims. (Cl. 188—33)

My invention relates to braking equipment and is particularly concerned with a new and novel duplex braking system adapted for railway car use having interconnected braking mechanisms, wherein a force derived from the engagement of one braking mechanism is transmitted to actuate the other.

More particularly, my novel invention is concerned with a duplex braking system having a power operated braking mechanism carried by the truck and another braking mechanism carried by the truck and operatively connected to the first braking mechanism to be actuated by a force derived from the braking torque imposed thereon.

My invention contemplates the provision of means producing positive simultaneous engagement of both braking mechanisms with respective revoluble friction members, irrespective of the direction of rotation of the revoluble friction members.

While my invention has been shown in but one form, it is obvious to those skilled in the art that it is not so limited but is susceptible of various modifications and forms without departing from the spirit and scope of the invention.

My invention embodies other novel features, details of construction and arrangements of parts, which are hereafter set forth in the specification and claims and illustrated in the accompanying drawings, wherein:

Figure 3 is an end elevational view taken from the right as seen in Figure 2.

Figure 4 is an enlarged sectional view taken on the line 4—4 of Figure 2.

Figure 5 is an enlarged sectional view taken on the line 5—5 of Figure 2, and

Figure 6 is an enlarged sectional view taken on the line 6—6 of Figure 2.

Figure 1:
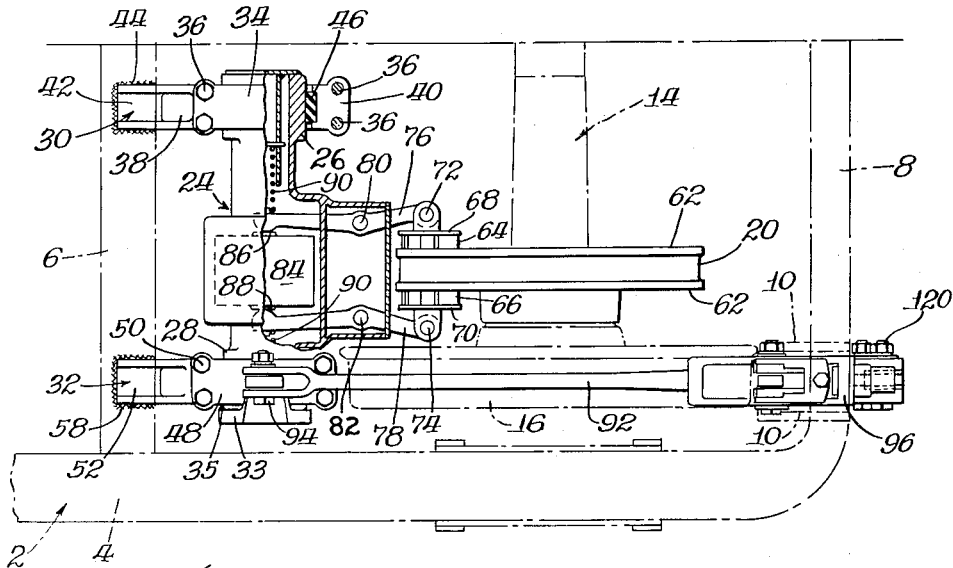
Figure 1 is a plan view, part in section, showing approximately one quarter of the railway car truck with my novel brake system applied thereto.

Describing my invention in detail and referring first to Figures 1 and 2, my novel brake system, as illustrated, comprises a sprung truck frame structure 2 having a side rail 4, transom 6, and an end rail 8 provided with brackets 10 and 12 at the opposite sides thereof for connection as hereinafter described. Truck frame 2 is supported by a wheel and axle assembly 14, including a wheel 16, an axle 18, and a brake disk or rotor 20 secured for rotation therewith. Side rail 4 is provided with a pair of depending pedestals 22, 22, adapted to embrace an associated juornal box (not shown) which affords support for a conventional equalizer (not shown).

Figure 2:
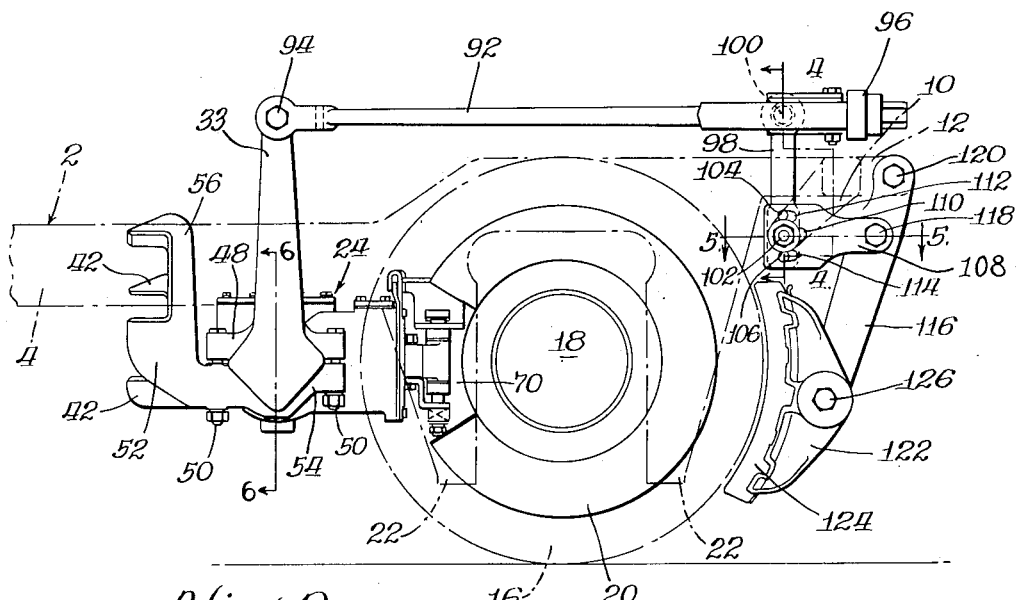
Figure 2 is a side elevational view.

Referring now to Figures 1, 2 and 6, the rotor braking mechanism includes a brake frame or support 24 provided with an inboard trunnion 26 and an outboard trunnion 28 journaled for limited turning in bearing brackets 30 and 32, respectively. An arm or torque arm 33 is welded, as at 35, to trunnion 28 for connection as hereinafter described.

Bearing bracket 30 comprises a cap 34 fastened by bolt and nut assemblies 36, 36, to a support member 38 having a base portion 40 and a jaw-like portion 42 for attachment to transom 6 by a weld 44. Bearing bracket 30 also includes a resilient ring 46 disposed around trunnion 26. Bearing bracket 32 is similar to bearing bracket 30 and comprises cap 48 fastened by bolt and nut assemblies 50 to a support member 52 having a base portion 54 and a jaw-like portion 56 for attachment to transom 6 by a weld 58. Bearing bracket 32 also includes a resilient ring 60 disposed around the trunnion 28.

The rotor brake also comprises the rotor 20 having spaced radial friction surfaces 62, 62, for engagement with brake shoes 64 and 66 carried by brake heads 68 and 70, respectively. Brake heads 68 and 70 are pivotally connected at 72 and 74, respectively, to brake levers 76 and 78 having pivotal fulcrums 80 and 82, respectively, in brake frame 24.

A conventional power cylinder device 84 is provided in brake frame 24 for actuation of levers 76 and 78 as at 86 and 88, respectively. Brake release springs 90, 90, are operatively disposed within brake frame 24 to yieldingly resist the actuation of levers 76 and 78.

A rod 92 is pivotally connected to arm 33, as at 94; a conventional slack adjusting device 96 is provided on an end of rod 92. A lever 98 is pivotally connected to the slack adjusting end of rod 92, as at 100, and pivotally fulcrumed to bracket 10 by bolt and nut assembly 102; lever 98 is provided with pairs of opposed lugs 104 and 106 disposed above and below connection 102. The lugs 104 are preferably concentric to each other, and the lugs 106 are preferably concentric to each other. Spaced links 108, 108, embrace an end of lever 98 and are provided with registering elongated slots 110, 110, for sliding support by bolt and nut assembly 102 and are also provided with registering slots 112, 112, and registering slots 114, 114, for engagement with lugs 104 and 106, respectively. Links 108 are pivotally connected to a hanger lever 116, as at 118.

The wheel braking mechanism comprises hanger lever 116 pivotally fulcrumed to bracket 12, as at 120, and a brake head 122, having a shoe 124 thereon, is pivotally connected to hanger lever 116, as at 126.

The operation of my novel duplex braking system is as follows:

A fluid under pressure is introduced to the power cylinder 84 energizing same, and urging the brake levers 76 and 78 to rotate in a clockwise and counterclockwise direction, respectively, whereby the brake shoes 64 and 66 engage the related brake surfaces 62, 62. The frictional engagement between the brake frame supported shoes 64 and 66 and the rotor 20 causes the shoes to be dragged in the direction of rotation of the rotor, that is, upwardly or downwardly as the case may be. As noted the brake frame 24 is flexibly journaled by means of trunnions 26 and 28 which are received by the resilient rings 46 and 60, hence, as seen in Figure 2, upon upward movement of the brake shoes the brake frame is rotated in a counter-clockwise direction and upon downward movement of the brake shoes the brake frame is rotated in a clockwise direction. Inasmuch as the trunnions 26 and 28 are clamped tightly within the related resilient rings 46 and 60, a part of the mentioned rotation is accommodated by the torsional deformation of said rings.

The arm 33, being fixedly secured to the associated trunnion 28 of the brake frame 24 rotates directionally and concurrently with the rotation of the brake frame 24. Upon counterclockwise rotation of the arm 33 motion to the left as seen in Figures 1 and 2 is imparted to the rod 92, which in turn rotates the lever 98 counterclockwise about the fixed pivot or fulcrum 102. The counterclockwise rotation of the lever 98 brings the lugs 104 into engagement with the inboard extremity of the slots 112, urging the links 108 and the connected hanger lever 116 to move to the left, thereby engaging the brake shoe 124 with the periphery of the related wheel. Upon clockwise rotation of the arm 33 the rod 92 is urged to move to the right whereby a clockwise rotation of the lever 98 about the fixed pivot 102 results. Upon clockwise rotation of the lever 98 the lugs 106 engage the inboard extremity of slots 114 urging the links 108 and the connected hanger lever 116 to move to the left, again engaging the brake shoe 124 with the periphery of the related wheel. It should be noted that the slot 118 provides adequate clearance for the movements of the links 108 passing the fixed pivot 102.

It should also be noted that the engagement of the shoe 124 with the related wheel tread effectively stops or limits further motion of the actuating linkage, thereby limiting rotation of the brake frame 24.

Thus the above described embodiment utilizes the torque forces resulting from the actuation of one braking mechanism to furnish the power to actuate a second braking mechanism. It should be noted that the action of both mechanisms is concurrent and substantially simultaneous.

I claim:

1. In an interconnected, simultaneously braking, duplex brake system for a railway car truck having a wheel and axle assembly with a rotor thereon; the combination of a power operated rotor braking mechanism pivotally mounted on said truck, an arm secured to said braking mechanism for movement therewith, a rod pivotally connected to said arm, a hanger lever fulcrumed on said truck, friction means secured to said hanger lever for engagement with said wheel, and means operatively connected between said rod and hanger lever to transmit a substantially uni-directional force to said hanger lever causing the engagement of said friction means with said wheel, irrespective of the direction of rotation of said wheel and rotor, said force being derived from the turning moment exerted upon said rotor braking mechanism.

2. In a duplex brake arrangement for a railway car truck having a wheel and axle assembly with a rotor thereon; the combination of a power operated rotor braking mechanism pivotally mounted on said truck, a wheel braking mechanism fulcrumed on said truck, and means interconnecting said braking mechanisms to translate an actuating force derived from the turning moment exerted upon the rotor braking mechanism into a substantially uni-directional force acting upon said wheel braking mechanism causing the engagement thereof with the wheel, irrespective of the direction of rotation of said wheel and axle assembly.

3. An interconnected, simultaneously braking, duplex brake system for a railway car truck comprising two revoluble braking members, a power operated braking mechanism pivotally mounted on said truck for engagement with one of said revoluble braking members, a hanger lever fulcrumed on said truck, a brake head having a brake shoe thereon pivotally connected to said hanger lever for engagement with the other of said revoluble braking members, and means operatively interconnecting said power operated braking mechanism and said hanger lever to transmit an operating force to said hanger lever derived from the turning moment exerted upon said power operated braking mechanism, irrespective of the direction of rotation of said revoluble braking member.

4. In an interconnected, simultaneously braking, duplex brake system for a railway car truck having a wheel and axle assembly with a rotor thereon; the combination of a power operated rotor braking mechanism journaled to said truck for limited turning, an arm secured to said mechanism for movement therewith, a rod pivotally connected to said arm, a wheel braking mechanism fulcrumed on said truck, and means interconnecting said rod and said wheel braking mechanism comprising a lever pivotally connected at one end thereof to said rod, said lever being pivotally connected at the other end thereof to said truck, said lever being provided with a lug above and a lug below said pivotal connection to said truck, a link having slots in one end thereof for engagement with said lugs and an elongated slot intermediate said slots for a sliding connection with said pivotal connection to said truck, said link having its other end pivotally connected to said wheel braking mechanism.

5. In an interconnected, simultaneously braking, duplex brake system for a railway car truck having a sprung truck frame and a wheel and axle assembly with a rotor thereon; the combination of a brake frame resiliently journaled to said truck frame for limited turning, an arm secured to said brake frame for movement therewith, power means secured in said brake frame, a pair of brake levers fulcrumed in said brake frame and operatively engaged with said power means, resilient brake release means secured in said brake frame and operatively engaged with said levers, friction means carried by said levers for braking engagement with said rotor, a rod pivotally connected to said arm, slack adjusting means carried on said rod, a hanger lever fulcrumed on said truck frame, friction means carried by said hanger lever for braking engagement with said wheel, and means operatively connected between said rod and hanger lever to transmit an actuating force to said hanger lever, irrespective of the direction of rotation of said wheel and rotor, said means comprising a lever having one end pivotally connected to said rod and the other end pivotally fulcrumed to said truck frame by a bolt and nut assembly, said lever being provided with concentrically disposed lugs on the sides thereof above and below said bolt and nut assembly, and spaced links pivotally connected at one end thereof to said hanger lever and provided at the other end with registering elongated slots for connection with said bolt and nut assembly, said spaced links being provided with registering slots above and below said elongated slots for engagement with said lugs.

6. In an interconnected, simultaneously braking, duplex brake system for a railway car truck having two revoluble braking members; the combination of a power operated braking mechanism pivotally secured to said truck and engageable with one of said revoluble braking members, another braking mechanism fulcrumed on said truck and engageable with the other revoluble braking member, a rod pivotally connected to said power operated braking mechanism and means operatively connected between said rod and said other braking mechanism to transmit an actuating force derived from the turning moment exerted upon said power operated braking mechanism to the other braking mechanism, irrespective of the direction of rotation of said revoluble braking members.

7. In a duplex brake system of the character described having a truck frame and two revoluble braking members; the combination of a power operated braking mechanism movably mounted to said frame and engageable with one of said braking members, said braking mechanism being moveable in response to the torque produced by its engagement with said one braking member, another braking mechanism fulcrumed on said frame and engageable with the other of said braking members, and a torque transmitting mechanism connected between said braking mechanisms to operate said other braking mechanism in response to the transmission of said torque produced by the engagement of said first mentioned brake mechanism with said one braking member, irrespective of the direction of rotation of said revoluble braking members.

8. In an interconnected, simultaneously braking, duplex brake system for a railway car truck having a wheel and axle assembly with a rotor thereon; the combination of bearing brackets secured to said truck, a power operated rotor braking mechanism comprising a brake frame journaled in said bearing brackets for limited turning, an arm secured to said brake frame for movement therewith, a power actuating device secured in said brake frame, braking means carried by said brake frame for engagement with said rotor, said braking means being actuated by said device, a wheel braking mechanism comprising a hanger lever, and braking means carried by said hanger lever for engagement with said wheel, said hanger lever being operatively connected to said arm to receive an actuating force derived from the turning moment exerted upon said brake frame, irrespective of the direction of rotation of said rotor and wheel.

9. In an interconnected, simultaneously braking, duplex brake system for a railway car truck having a wheel and axle assembly with a rotor thereon; the combination of bearing brackets having resilient bearing members secured therein, said bearing brackets being secured to said truck, a power operated rotor braking mechanism comprising a brake frame resiliently journaled in said brackets for limited turning, an arm secured to said brake frame for movement therewith, a cylinder and piston device secured in said brake frame, a pair of brake levers pivotally fulcrumed to said brake frame and operatively engaged with said device, a brake head pivotally connected to each lever, friction shoes secured to each brake head for engagement with said rotor, a wheel braking mechanism comprising a hanger lever fulcrumed on said truck, a brake head pivotally connected to said hanger lever, and a brake shoe secured to said brake head for engagement with said wheel, said hanger lever being operatively connected to said arm to receive an actuating force derived from the turning moment exerted upon said rotor braking mechanism, irrespective of the direction of rotation of said rotor and wheel.

10. In an innterconnected, simultaneously braking, duplex brake system for a railway car truck having a wheel and axle assembly with a rotor thereon; the combination of bearing brackets having resilient bearing members secured therein, said bearing brackets being secured to said truck, a power operated rotor braking mechanism resiliently journaled in said bearing brackets for limiting turning, an arm secured to said rotor braking mechanism for movement therewith, and a wheel braking mechanism operatively connected to said arm, said wheel braking mechanism being operated by a force derived from the turning moment exerted upon said rotor braking mechanism, irrespective of the direction of rotation of said rotor and wheel.

11. In a duplex brake arrangement for a railway car truck having a wheel and axle assembly with a rotor thereon; the combination of a power operated rotor brake journaled to said truck, a wheel brake fulcrumed on said truck for movement in response to the torque produced by actuation of said rotor brake, and a torque transmitting mechanism positively connecting said brakes to transmit torque from said rotor brake to the wheel brake for operation of the latter.

References Cited in the file of this patent

UNITED STATES PATENTS

| | | |
|---|---|---|
| 441,015 | Mets | Nov. 18, 1890 |
| 2,295,244 | Tack | Sept. 8, 1942 |
| 2,481,127 | Ledwinka | Sept. 6, 1949 |
| 2,581,746 | Baselt | Jan. 8, 1952 |
| 2,656,900 | Tack | Oct. 27, 1953 |